(12) United States Patent
Sarwar et al.

(10) Patent No.: US 10,167,803 B2
(45) Date of Patent: Jan. 1, 2019

(54) SYSTEMS AND METHODS FOR PERFORMING PROGNOSIS OF FUEL DELIVERY

(71) Applicant: GM GLOBAL TECHNOLOGY OPERATIONS LLC, Detroit, MI (US)

(72) Inventors: Azeem Sarwar, Rochester Hills, MI (US); Chaitanya Sankavaram, Sterling Heights, MI (US); Ian J. Macewen, White Lake, MI (US); Steven Ward Majors, Howell, MI (US); Scott R. Jeffrey, Hartland, MI (US); Rafat F. Hattar, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

(21) Appl. No.: 15/169,802

(22) Filed: Jun. 1, 2016

(65) Prior Publication Data
US 2017/0350340 A1 Dec. 7, 2017

(51) Int. Cl.
*F02D 41/22* (2006.01)
*F01N 3/20* (2006.01)
(Continued)

(52) U.S. Cl.
CPC ............ *F02D 41/221* (2013.01); *F01N 3/20* (2013.01); *F02D 41/1454* (2013.01);
(Continued)

(58) Field of Classification Search
CPC ...... F01N 3/20; F02D 41/1454; F02D 41/221; F02D 41/26; F02D 41/1473; F02D 41/38;
(Continued)

(56) References Cited

U.S. PATENT DOCUMENTS

| 7,159,623 | B1 * | 1/2007 | Carr | F02D 19/0628 |
| | | | | 123/516 |
| 7,735,476 | B2 * | 6/2010 | Carr | F02D 19/0605 |
| | | | | 123/1 A |

(Continued)

OTHER PUBLICATIONS

Burkhard, J., "Individual Cylinder Fuel Control for a Turbocharged Engine," SAE Technical Paper 2014-01-1167, 2014, doi:10.4271/2014-01-1167.

*Primary Examiner* — Sizo Vilakazi
(74) *Attorney, Agent, or Firm* — Quinn IP Law

(57) ABSTRACT

An engine includes a plurality of combustion cylinders configured to burn a fuel to power the engine, and a plurality of fuel injectors. Each of the fuel injectors is arranged to distribute fuel delivered from a fuel tank to one of the plurality of combustion cylinders. The engine also includes a controller programmed to adjust a fuel trim signal gain based on sensing exhaust flow downstream of the combustion cylinders. The controller is also programmed to monitor a cumulative misfire count for each of the plurality of combustion cylinders. The controller is further programmed to issue a prognosis message identifying a state of health of at least one of the plurality of fuel injectors in response to a fuel trim signal gain exceeding an adjustment threshold and a cumulative misfire count greater than a misfire threshold.

7 Claims, 5 Drawing Sheets

(51) Int. Cl.
*F02D 41/14* (2006.01)
*F02D 41/26* (2006.01)
*F02D 41/38* (2006.01)

(52) U.S. Cl.
CPC ......... *F02D 41/1473* (2013.01); *F02D 41/26* (2013.01); *F02D 41/38* (2013.01); F02D 2041/224 (2013.01); F02D 2200/1015 (2013.01); *Y02T 10/40* (2013.01)

(58) Field of Classification Search
CPC ....... F02D 2041/224; F02D 2200/1015; Y02T 10/40; Y02T 10/47; Y02T 10/44
See application file for complete search history.

(56) References Cited

U.S. PATENT DOCUMENTS

| | | | |
|---|---|---|---|
| 8,055,460 B2 * | 11/2011 | Rajagopalan ...... | G01R 31/2829 324/415 |
| 8,433,672 B2 * | 4/2013 | Shin .................... | G07C 5/0808 706/62 |
| 2017/0022927 A1 * | 1/2017 | Sanborn ................ | F02M 59/20 |

* cited by examiner

SYSTEMS AND METHODS FOR PERFORMING PROGNOSIS OF FUEL DELIVERY

TECHNICAL FIELD

The present disclosure relates to vehicle powertrain fuel delivery.

INTRODUCTION

Fuel delivery to an internal combustion engine affects engine performance and may be regulated by one or more fuel injectors that distribute fuel delivered from a fuel tank. The fuel injectors, along with a number of other components arranged between the fuel tank and an engine combustion chamber facilitate precise delivery of fuel to the engine. Failure of any of the fuel delivery components can affect proper cylinder combustion and degrade engine performance.

SUMMARY

An engine includes a plurality of combustion cylinders configured to burn a fuel to power the engine, and a plurality of fuel injectors. Each of the fuel injectors is arranged to distribute fuel delivered from a fuel tank to one of the plurality of combustion cylinders. The engine also includes a controller programmed to adjust a fuel trim signal gain based on sensing exhaust flow downstream of the combustion cylinders. The controller is also programmed to monitor a cumulative misfire count for each of the plurality of combustion cylinders. The controller is further programmed to issue a prognosis message identifying a state of health of at least one of the plurality of fuel injectors in response to a fuel trim signal gain exceeding an adjustment threshold and a cumulative misfire count greater than a misfire threshold.

A method of conducting fuel injector prognosis includes sensing oxygen content in an exhaust flow downstream of at least one cylinder bank. The method also includes measuring an air-fuel ratio of combustion within each cylinder bank based on the sensed oxygen content. The method further includes counting misfires of a cylinder of the at least one cylinder banks, and issuing a prognosis warning message indicative of an air-fuel imbalance associated with the at least one cylinder. The prognosis warning message is issued in response to the count of misfires exceeding a misfire threshold and the air-fuel ratio exceeding a threshold.

A fuel delivery prognosis system for an engine includes a plurality of combustion cylinders arranged in at least one cylinder bank and a fuel injector in fluid communication with each individual combustion cylinder. The fuel injectors distribute within each combustion cylinder fuel delivered fuel from a fuel tank. The fuel delivery prognosis system also includes at least one sensor disposed in an exhaust flow path of each cylinder bank. The fuel delivery prognosis system further includes a controller programmed to monitor oxygen content of the exhaust flow based on a signal from the at least one sensor, and adjust a fuel volume delivered from the fuel tank based on an engine torque demand. The controller is also programmed to adjust a fuel trim value based on the oxygen content of the exhaust flow, and issue a prognosis warning message indicative of an air-fuel imbalance associated with at least one cylinder bank in response to the fuel trim value exceeding an adjustment threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
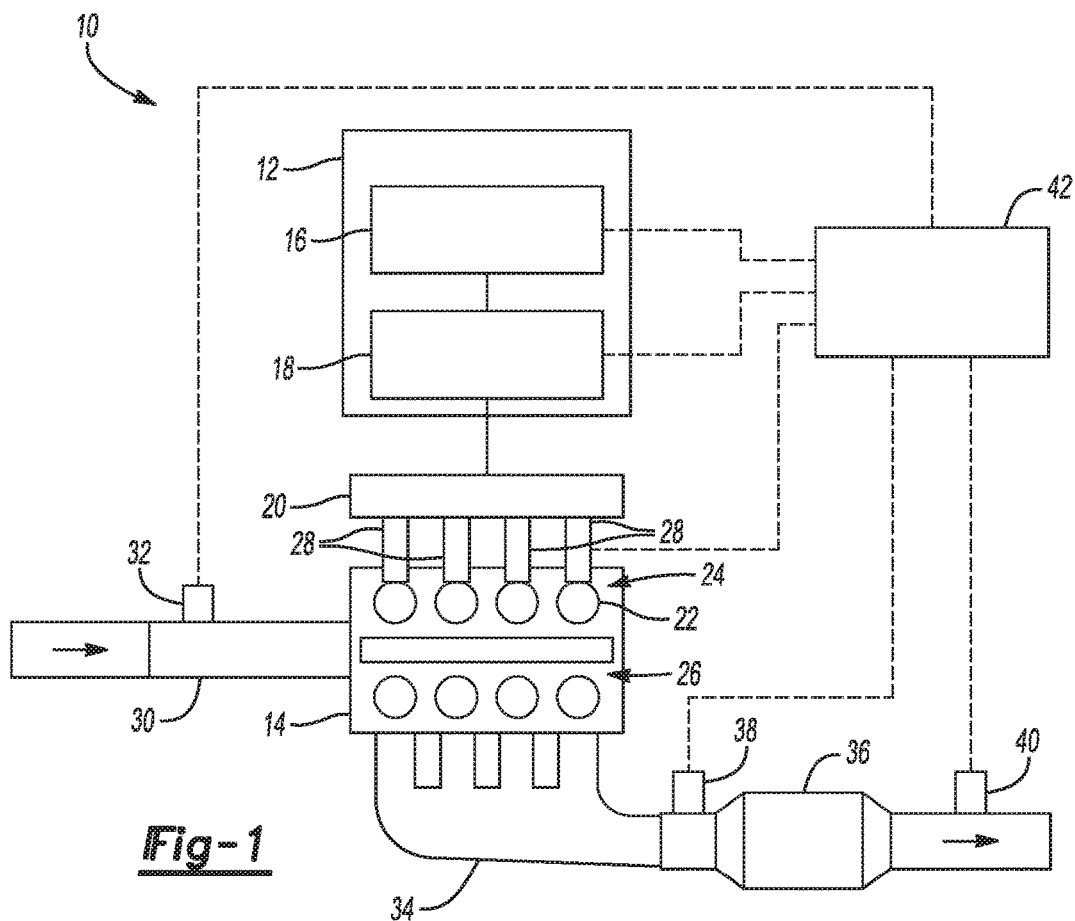
FIG. 1 is a schematic system diagram of a vehicle engine fuel delivery system.

Referring to FIG. 1, a fuel delivery system 10 provides fuel for an internal combustion engine 14. The fuel delivery system 10 may provide fuel to the engine 14 in the form of gasoline and/or ethanol in various percentages. In the example provided, the fuel delivery system 10 is a high-pressure direct injection system. Fuel is pressurized prior to delivery to the engine 14. A low-pressure fuel supply pump 16 draws fuel from a reservoir portion of the fuel tank 12 to pass the fuel to a high-pressure fuel pump 18. A pressure rise is created within the high-pressure pump 18 and the pressurized fuel is delivered through a fuel rail 20 to each of a plurality of combustion cylinders 22 of the engine 14.

Each cylinder 22 receives pressurized fuel from the fuel rail 20 and the fuel is dispersed within the cylinder by a fuel injector 28. Each fuel injector includes a closable nozzle to regulate the timing of fuel spray pulses. Multiple fuel injectors 28 are in fluid communication with the plurality of combustion cylinders 22 such that each cylinder receives fuel delivered from a single injector 28. While FIG. 1 schematically depicts four fuel injectors 28 corresponding to the first bank 24, it should be appreciated that there is a fuel injector 28 for each of the plurality of cylinders 22 regardless of the number of cylinders.

The plurality of cylinders 22 are arranged in separate groups, or banks. In the example of FIG. 1, a first bank 24 includes four cylinders, and a second bank 26 includes four cylinders. The first bank 24 and the second bank 26 are fluidly separated, and each outputs an exhaust flow to expel combustion byproducts. While eight cylinders are depicted by way of example, aspects of the present disclosure may benefit an engine having any number of combustion cylinders. In alternative examples, the cylinders 22 may also be arranged in an inline orientation in a single bank.

Air is supplied to each cylinder 22 through an intake manifold 30. The intake manifold 30 directs air to each of the cylinders through an air valve (not shown) corresponding to each cylinder. The air is mixed within each cylinder 22 with the pressurized fuel to create a desirable air to fuel ratio (air-fuel ratio) to facilitate optimal fuel combustion. An intake sensor 32 is located near the intake manifold 30 to provide a signal indicative of the flow of air passing through the intake manifold. The intake sensor may provide data regarding the density, temperature, and/or volumetric flow rate of air entering the intake manifold 30.

The combustion within each cylinder 22 drives a piston which in turn rotates crankshaft to output torque from the engine. According to aspects of the disclosure, pressurized fuel from each fuel injector 28 is directly sprayed into a corresponding cylinder 22 to mix with air once inside of the cylinder as opposed to being pre-mixed before fuel injection. Direct injection of pressurized fuel into the cylinders enhances the ability to send precise amounts of fuel to the cylinders at exact timing intervals. For example, the high-pressure pump 18 may generate fuel pressure delivered to the fuel rail 20 at up to about 2,500 psi.

Following combustion, remaining byproduct is emitted in the form of exhaust gas and outlet through an exhaust manifold 34. The exhaust gas is then directed through a catalyst 36 to filter pollutants from the exhaust gas prior to being expelled into the environment. These pollutants may include CO, NOx, as well as hydrocarbons related to unburned and partially burned fuel. The content of the exhaust flow varies based on the quality of the combustion within the combustion chambers and may be indicative of lean combustion (higher air percentage than an ideal stoichiometric ratio) or rich combustion (lower air percentage than a stoichiometric ratio) conditions. While a single exhaust manifold 34 and catalyst 36 are depicted in FIG. 1, there may be separate exhaust manifolds and catalysts dedicated to each of the combustion cylinder banks 24, 26 to independently direct exhaust flow post-combustion.

A first sensor 38 is located upstream of the catalyst 36 to sense oxygen content in the exhaust flow leaving the engine. The first sensor 38 provides direct data indicative of the quality of combustion. Specifically, the first sensor 38 provides an indication of whether the engine combustion is lean or rich. In one example, a separate first sensor 38 is assigned to each of the first bank 24 and the second bank 26 to independently monitor the performance of each of the multiple cylinder banks.

A second sensor 40 is located downstream of the catalyst 36 to sense oxygen content in the exhaust flow following catalytic conversion. The second sensor 40 provides data regarding the exhaust flow exiting the catalyst 36. These data indicate the performance of the catalyst by indicating the degree by which pollutants within the exhaust flow are lessened. The second sensor 40 may be used to fine tune the assumed air-fuel ratio which was targeted for location of the first sensor 38 in response to changes in catalyst performance due to aging, degradation, and/or part to part variability, for example.

The various fuel delivery components discussed herein may have one or more associated controllers to control and monitor operation. Controller 42, although schematically depicted as a single controller, may be implemented as one controller, or as system of controllers in cooperation to collectively manage fuel delivery. Multiple controllers may be in communication via a serial bus (e.g., Controller Area Network (CAN)) or via discrete conductors. Further, the controller 42 may include vehicle on-board processing portions such as a vehicle computing system, as well as off-board processing portions such as an external server. Such on-board and off-board processors may be in remote communication and cooperate with one another to control and/or monitor fuel delivery.

The controller 42 is programmed to coordinate the operation of the various fuel delivery components. Controller 42 monitors a fuel demand of the engine 14 required to output torque. In some examples, fuel demand varies based at least on driver input at an accelerator pedal (not shown). In other examples, the fuel demand of the engine may be automatically determined by the controller 42 without driver accelerator pedal input, such as for a self-driving autonomous vehicle. The controller 42 also monitors operating conditions of the low-pressure supply fuel pump 16, the high-pressure fuel pump 18, fuel rail 20, fuel injectors 28, cylinders 22, and/or the catalyst 36. The low-pressure fuel supply pump 16 may include sensors to provide the controller 42 with information regarding the amount of fuel supplied to the high-pressure fuel pump 18. The high-pressure fuel pump 18 includes one or more sensors which provide feedback information to the controller 42 regarding pump operation. As discussed above, the first sensor 38 provides data regarding the content of the exhaust flow leaving the exhaust manifold 34. The data provided by the first sensor 38 indicates whether the combustion is lean or rich. The second sensor 40 also provides data regarding exhaust content, but is located downstream of the catalyst 36, and indicates the degree of performance of the catalyst 36.

Demand for engine output may be determined by a desired vehicle speed and/or acceleration. Based on the engine output demand, the controller 42 controls the amount of fuel delivered to the engine 14 according to a desired vehicle propulsion state. The controller 42 is programmed to attempt to maintain a long term stoichiometric air-fuel ratio to obtain a complete and efficient combustion of fuel during propulsion. In the example of a gasoline engine, the stoichiometric air-fuel ratio is targeted to be about 14.7:1. If the controller 42 detects deviation from the ideal target, it adds or subtracts fuel to the mixture to compensate and correct the ratio.

Fuel, air and/or re-circulated exhaust directed to the engine 14 may be adjusted, i.e., trimmed, to correct for deviations from a desired air-fuel ratio. Trim values used to make such corrections may be stored in a memory of controller 42. Long-term fuel trim may be indicated by one or more long-term multipliers (LTMs) used to provide corrections to commands for fuel delivery to the engine 14 in response to changing engine conditions. The controller 42 adjusts LTMs periodically in accordance with a long-term time period, for example, using a period that is longer than 1 second such as ten seconds. LTMs may be stored in a memory lookup table in non-volatile memory. The LTM values are maintained such that after engine shutdown, the LTM's may serve as a starting point for adjustments in subsequent drive cycles. Generally, when an LTM adjustment exceed a threshold, the controller is likely compensating for a faulty component—that is, a cause beyond normal engine wear. Additionally, a LTM value may be separately maintained for each of the cylinder banks 24, 26.

The controller 42 issues commands regarding the content of the fuel delivered based at least upon the data from at least one of the first sensor 38 and the second sensor 40. In one example, the sensors may report the content of oxygen in the exhaust flow to the controller 42 as a voltage reading. When the oxygen content is high, the controller 42 recognizes a lean condition and in response issues a command to increase fuel delivery. When the oxygen content in the exhaust stream is low, a rich condition is detected and the controller 42 issues a command to reduce fuel delivery. It should be appreciated that any one of multiple sensor types capable of detecting oxygen content may be suitable according to the present disclosure.

The LTM values indicate a history of how the controller 42 has adjusted fuel trim over a longer duration. As with short-term adjustments, the controller adds fuel to compensate for a lean condition, and reduces a fuel delivery rate to overcome a rich condition. If either of these conditions exists for a prolonged period of time and the LTM values exceed a predetermined threshold, the controller 42 may recognize a fault condition.

A leaking fuel injector, excessive fuel pressure, exhaust or intake sensor defects, or exhaust leaks upstream of the exhaust sensor each may cause the controller to adjust fuel delivery to compensate for a rich condition. Conversely, an air leak, a clogged or dirty injector or fuel filter, miscalculated air flow, or exhaust restrictions such as a clogged catalytic converter could be the cause of a lean condition and subsequent controller compensation. Abnormal fuel trim conditions that persist may eventually take a toll and cause damage to the catalyst 36.

Figure 2:
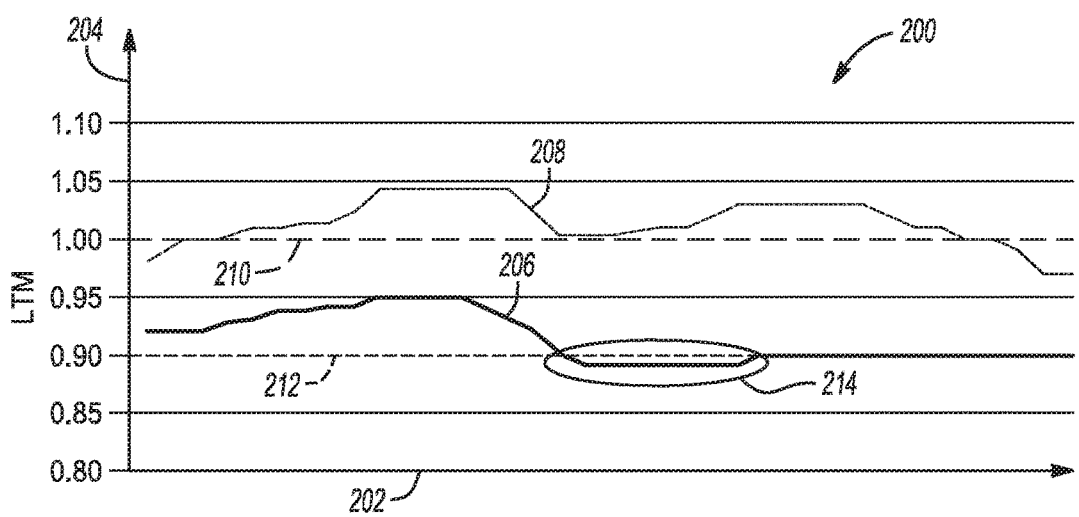
FIG. 2 is a plot of a fuel trim adjustment trend over the course of a drive cycle.

Referring to FIG. 2, plot 200 shows an example trend of LTM behavior over the course of a drive cycle. Horizontal axis 202 represents time, and vertical axis 204 represents the LTM value applied to adjust fuel delivery in response to operating conditions. The LTM of each bank of combustion cylinders is monitored and adjusted independently of the opposing bank. Curve 206 represents the LTM of fuel trim for a first cylinder bank, and curve 208 represents the LTM of fuel trim for a second cylinder bank. The values are unique relative to each other due to different combustion conditions between the different cylinder banks.

The controller is programmed to consider both the difference between LTM values of the separate banks, as well as an amount of LTM deviation from a normalized value that may be initially determined during calibration. In the example of FIG. 2, the normalized mean LTM value for operation of both cylinders is around 0.95. The controller may store one or more threshold values spaced about the normalized value for monitoring trends of the fuel trim LTM. As driving data is acquired, both the normalized mean LTM as well as the corresponding thresholds may evolve based on operating conditions. For example, an upper LTM threshold may have a value of around 1.00 as indicated by line 210. Similarly, a lower LTM threshold may have a value of around 0.90 as indicated by line 212. As demonstrated by curve 206, the first cylinder bank largely operates within a range between the upper LTM threshold and the lower LTM threshold, with an exception occurring around the time of region 214.

Comparatively, the LTM trend corresponding to the second cylinder bank as depicted by curve 208 exhibits operation at LTM values greater than the upper LTM threshold line 210 for significantly longer duration of time. More specifically, the LTM value applied to the fuel trim of the first cylinder bank exceeds the threshold for substantially all of the data set presented in plot 200. Higher than normalized LTM values indicate a lean condition in the cylinder bank. That is, the fuel trim multiplier increases the amount of fuel delivered to the bank to compensate for the lean condition in an attempt to maintain the air-fuel ratio of combustion closer to a stoichiometric condition. In at least one example, the controller is programmed to respond and cause subsequent vehicle actions when the LTM value is beyond a threshold for greater than a predetermined duration of time.

The controller may additionally compare the fuel trim values applied to the first cylinder bank with the fuel trim values applied to the second cylinder bank. In one example, if the LTM value of one cylinder bank deviates from the LTM value of the other cylinder bank by more than a deviation threshold, the controller may flag the LTM value furthest from the normalized fuel trim value as an indicator of a degraded combustion condition. Such degradation may further trigger a prognosis response such that the controller issues a warning message prior to a hard failure of fuel delivery or other engine components.

Figure 3:
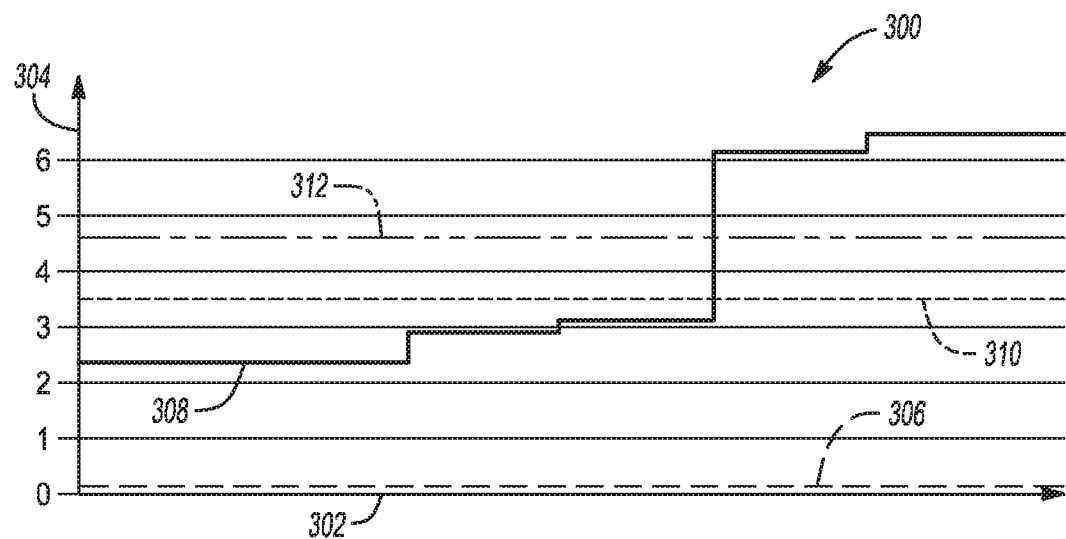
FIG. 3 is a plot of an air-fuel balance indicator.

Referring to FIG. 3, plot 300 depicts a calculated air-fuel balance value for each of a first cylinder bank and a second cylinder bank. The horizontal axis 302 represents time, and vertical axis 304 represents the air-fuel balance value. The air-fuel balance value represents the combustion condition for a given bank of cylinders of the engine, and may be indicative of an imbalanced combustion condition which has deviated from stoichiometric. The air-fuel balance value of a nominal first cylinder bank is represented by curve 306, where the balance remains relatively constant throughout the drive cycle. Comparatively, the air-fuel balance value corresponding to a second cylinder bank as shown by curve 308 indicates imbalance such as that exhibited during a lean combustion condition. The deviation of the air-fuel balance value due to combustion imbalance may indicate degraded performance of at least one fuel injector within the second cylinder bank. According to aspects of the present disclosure, excessive imbalance may be determined based on a first threshold 310 that is a relative value determined from the air-fuel balance value 308 of the second cylinder bank. That is, the controller may be programmed to make a bank-to-bank assessment between cylinder banks to detect the presence of an imbalanced cylinder combustion condition. According to other aspects of the present disclosure, excessive imbalance may be determined based on a second threshold 312 that is an absolute air-fuel balance value. The controller may be programmed to detect the presence of an imbalanced combustion condition based on the air-fuel balance value exceeding at least one of the first threshold 310 and the second threshold 312. Once the controller detects an air-fuel imbalanced combustion condition in a given cylinder bank, the controller seeks to make a more granular assessment by determining whether misfire conditions exist, and identifying which cylinder(s) may be experiencing misfires.

Figure 4:
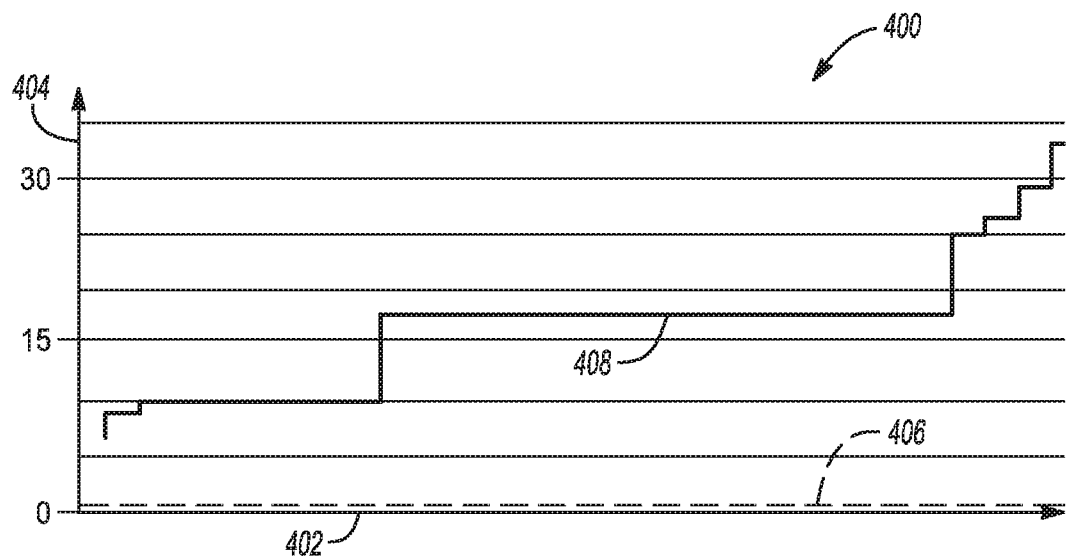
FIG. 4 is plot of cumulative misfire counts for each of a plurality of combustion cylinders within a cylinder bank.

Referring to FIG. 4, plot 400 represents a misfire count for each cylinder within the second cylinder bank of the engine. The horizontal axis 402 represents time, and the vertical axis 404 represents a cumulative misfire count associated with an individual cylinder. The cylinders are individually monitored and a misfire count is maintained for the drive cycle. In the example of FIG. 4, only one cylinder of the four cylinders in the bank exhibits degraded performance resulting in misfires. Curve 406 represents the misfire count for the three normally functioning fuel injectors and remains at zero throughout the drive cycle. While the count for each of the three normally-operating cylinders completely overlaps and remains at zero in the example provided, it should be appreciated that a misfire count for each cylinder may increase at differing rates between cylinders.

Curve 408 represents the cumulative misfire count for the single cylinder having degraded performance. The misfires may be caused by the malfunction of the fuel injector associated with the misfiring cylinder. Once the misfire count exceeds a count threshold for a particular cylinder, the controller may issue a prognosis warning message indicative of a fuel flow issue with the fuel injector associated with that particular cylinder. In the example of FIGS. 2 through 4, a lean combustion condition may be indicative of a low-flow fuel injector, such as a clogged or dirty fuel injector. In other examples a fuel injector may exhibit a high-flow condition causing a rich combustion condition. In this case, the root cause may be a leaking injector for example.

Figure 5A:
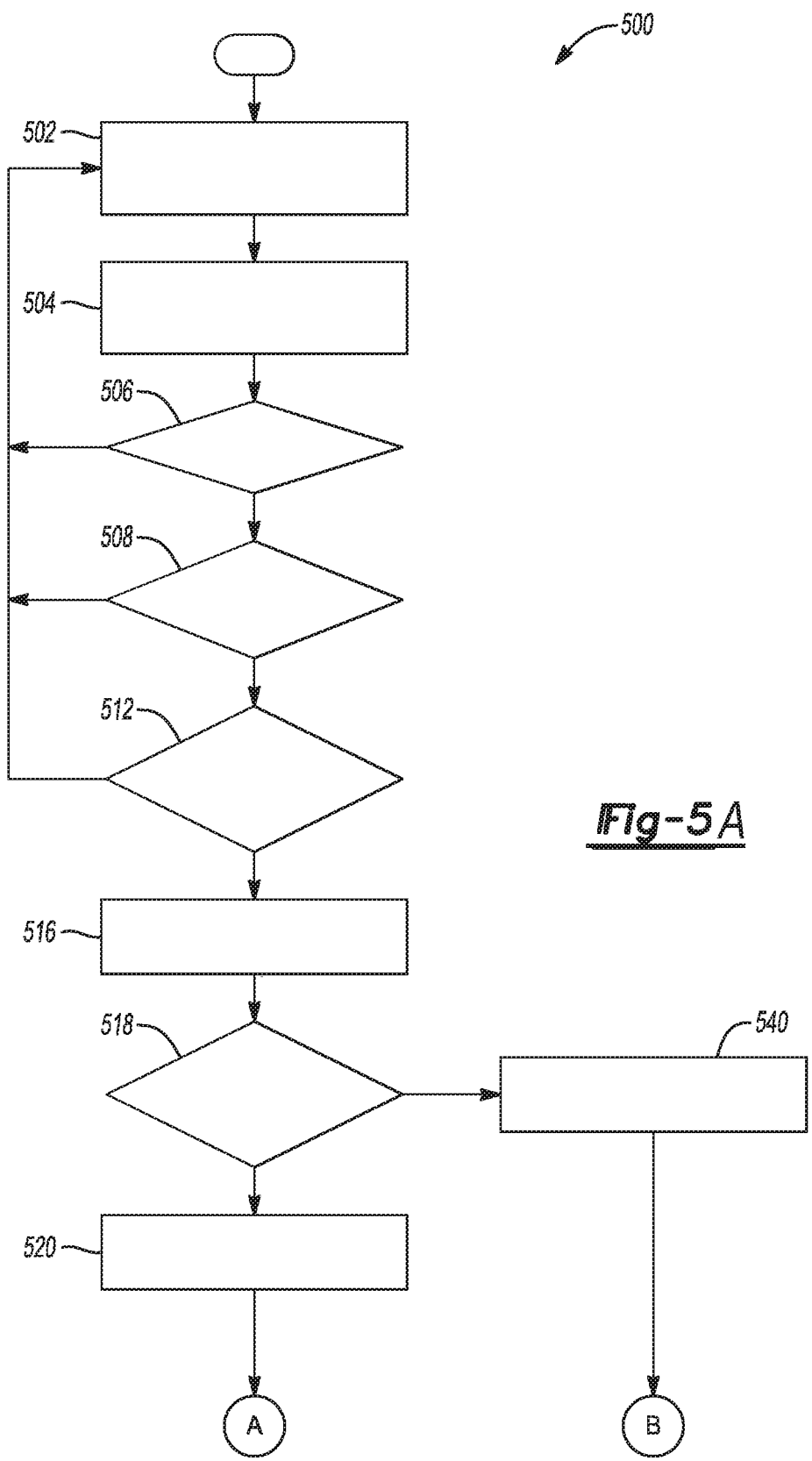
FIGS. 5A and 5B together form FIG. 5 and are a flow chart of a method of conducting a fuel injector prognosis.
Figure 5B:
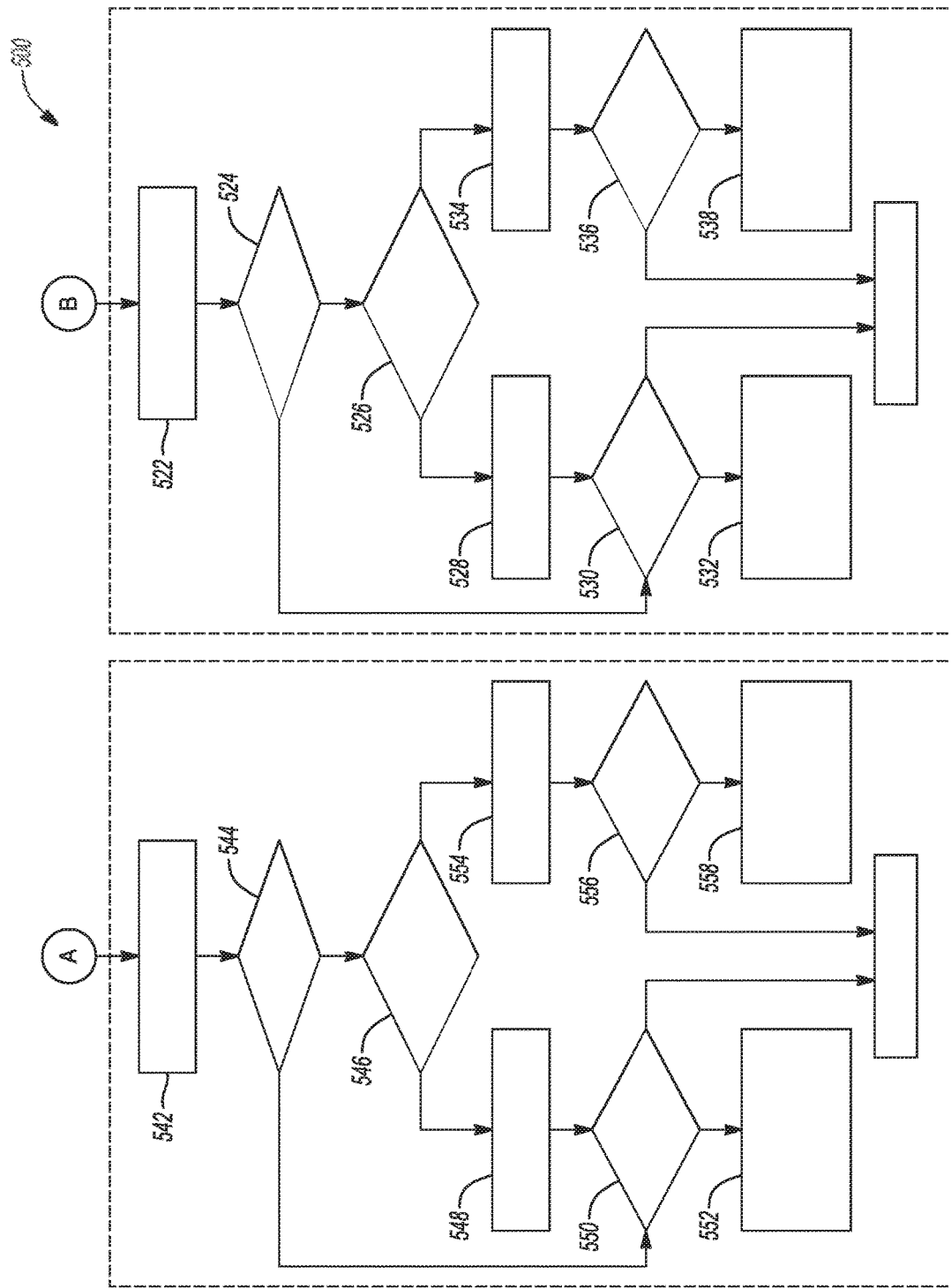

Referring to FIG. 5, method 500 of conducting a prognosis of fuel injector health is depicted. At step 502 a fuel delivery system controller collects long-term fuel trim information up to, and including the present trip. At step 504 the fuel trim information is normalized. According to aspects of the present disclosure, the fuel trim information may be normalized against predetermined failure thresholds. In one example, the applied fuel trim is divided by the predetermined failure threshold value to provide a percentage proximity to a known failure condition. According to other aspects of the present disclosure, the fuel trim information may be normalized against historical operating conditions of the vehicle. Updates in the upper and/or lower fuel trim failure thresholds are conducted relative to the normalized fuel trim target values.

At step 506 the method includes making an assessment of the present fuel trim values compared to the normalized values. The method also includes comparing present fuel trim values between the cylinder banks. If the fuel trim values are nominal at step 506 the controller may return to step 502 and continue to monitor the fuel trim condition.

If the controller detects fuel trim values that are no longer nominal at step 506, various operating conditions are assessed to determine the cause for the shift. At step 508 the controller detects whether fuel pressure is low as received from the fuel rail. If the fuel pressure is low from the fuel rail the condition may indicate a failure mode upstream in the fuel delivery flow path aside from the fuel injectors which causes a fuel trim shift. That is, upstream fuel flow faults may reduce the certainty of determining a specific fuel injector fault. If the fuel pressure is low as delivered from the fuel rail, the controller may return to step 502 and continue to monitor the fuel trim condition.

If at step 508 fuel pressure is within an acceptable range, the controller may detect at step 512 whether the properties of the air delivered for combustion are within an acceptable range. Data indicative of airflow mass and pressure may be gathered to assess the condition of incoming air. A volumetric efficiency correction may applied based on changing conditions of the incoming air. In one example the volumetric efficiency correction provides an assessment of the air measurement system generally, and indicates necessary adjustments for inlet air conditions such as density, temperature, etc. If there is an error associated with the volumetric efficiency correction value, it may cause an air-fuel imbalance independent of any potential problem with the fuel injectors. That is, upstream air flow faults may reduce the certainty of determining a specific fuel injector fault. If there is an inlet airflow error detected at step 512 the controller may return to step 502 and continue to monitor the fuel trim condition.

If the volumetric efficiency correction is nominal at step 512, the controller gathers data at step 516 regarding control system gains applied due to conditions detected by the sensor downstream of the catalyst. Such gains may be referred to as post-O2 gains. Step 516 may include sensing oxygen content in an exhaust flow both upstream as well as downstream of the catalyst. Depending on direction of the gains applied, it may be indicative of a lean condition or a rich condition. At step 518 the controller considers the direction of the shift in applied gains. If at step 518 the gains are shifting upward, the controller analyzes at step 520 signals that are relevant to indicate whether or not a fuel injector is causing a rich combustion condition.

While the oxygen sensor downstream of the catalyst is described by way of example, it is contemplated that step 516 may include sensing oxygen content in the exhaust at other locations along the exhaust flow path, including upstream of the catalyst.

At step 522 the controller collects data regarding the air-fuel imbalance. If at step 524 the air-fuel imbalance exceeds one or more thresholds as discussed above, the controller considers whether misfires have occurred in a given cylinder due to the imbalance. At step 526 if a misfire has been detected, the controller identifies at step 534 which fuel injector is implicated and determines that the relevant injector is causing a high fuel flow condition. At step 536 if the fuel trim gains have shifted to exceed a predetermined fuel trim threshold the controller issues at step 538 an injector-specific prognosis warning message indicative of degraded (high fuel flow) injector performance. If however at step 536 fuel trim gains remain within the fuel trim adjustment threshold values, the controller may return to the beginning of the prognosis method step 502 and continue to monitor the fuel delivery conditions. In this way some degree of increased fuel flow from a given fuel injector may be tolerated as being within an acceptable performance range.

If at step 526 no misfire is detected, at step 528 the controller is unable to identify a particular fuel injector within a cylinder bank that is causing the rich combustion condition. In this case a degraded condition may still exist and a warning message may be issued that is associated with a cylinder bank as a whole. At step 530 one or more fuel trim gain values are outside of the predetermined fuel trim threshold the controller may issue at step 532 a generic prognosis message indicative of a rich combustion within a given cylinder bank. If however at step 530 the fuel trim gain values are within the fuel trim adjustment threshold values, the controller may return to the beginning of the prognosis method step 502 and continue to monitor the fuel delivery conditions.

If at step 518 the gains are shifting downward, the controller analyzes at step 540 signals that are relevant to indicate whether or not a fuel injector is causing a lean combustion condition.

At step 542 the controller collects data regarding the air-fuel imbalance. If at step 544 the air-fuel ratio exceeds one or more thresholds indicating excessive imbalance, the controller considers whether misfires have occurred in a given cylinder due to the imbalance. At step 546 if a misfire has been detected, the controller identifies at step 554 which fuel injector is involved and determines that the relevant injector is causing a low fuel flow condition. At step 556 if the fuel trim gains have shifted to exceed a predetermined fuel trim adjustment threshold the controller issues at step 558 an injector-specific prognosis warning message indicative of degraded (low fuel flow) injector performance. If however at step 556 fuel trim gains remain within the fuel trim threshold values, the controller may return to the beginning of the prognosis method step 502 and continue to monitor the fuel delivery conditions. In this way some degree of reduced flow from a given fuel injector is tolerated as being within an acceptable performance range.

If at step 546 no misfire is detected, at step 548 the controller is unable to identify a particular fuel injector within a cylinder bank that is causing the lean combustion condition. In this case a degraded condition may still exist and a warning message that is associated with a cylinder bank as a whole may be issued. At step 550 one or more fuel trim gain values are outside of the predetermined fuel trim adjustment threshold the controller may issue at step 552 a generic prognosis message indicative of a lean combustion within a given cylinder bank. If however at step 550 the fuel trim gain values are within the fuel trim threshold values, the controller may return to the beginning of the prognosis method step 502 and continue to monitor the fuel delivery conditions.

Figure 6:
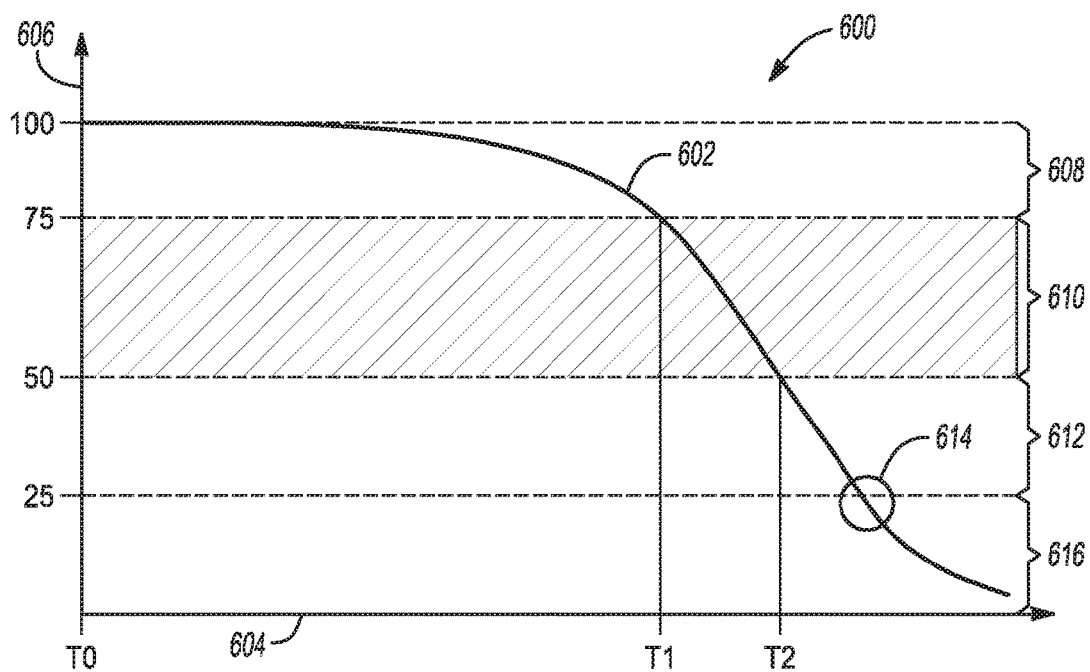
FIG. 6 is a plot of fuel injector state of health.

Referring to FIG. 6, plot 600 depicts a fuel injector health metric derived based on one or more of the combustion system attributes discussed above. Specifically, the fuel injector health metric represented by curve 602 may be based on at least one of LTM values, post-O2 gain values, and cylinder misfire counts for example. In one example, the controller may store an algorithm to calculate the fuel injector state of health based on a combination of multiple fuel delivery system operating parameters. Although a single curve 602 is depicted in plot 600, it is contemplated that a state of health value may be calculated for any number of individual fuel injectors. The horizontal axis 604 represents time, and vertical axis 606 represents fuel injector state of health as a percentage of useful life. At time T0, the state of health is about 100 percent and may begin to degrade over the useful life of the fuel injector. While the fuel injector operates in state of health range 608, the injector may be deemed fully healthy and the controller may take no responsive action. Once the derived fuel injector state of health value decreases to less than a first warning threshold, the controller may issue a first prognosis message to provide an indication of the degraded fuel injector health. In one example as depicted in FIG. 6, the first warning threshold is about 75 percent useful life. The first prognosis message may continue to be provided while the fuel injector operates within state of health range 610. In at least one example, the prognosis message is transmitted to an off-board diagnostic server external to the vehicle.

If fuel injector performance continues to degrade, the occurrence of certain combustion faults such as those discussed above may begin to increase in frequency and/or severity. If the fuel injector state of health value decreases to less than a second warning threshold, the controller may issue a warning message indicative of imminent failure of the fuel injector. Still referring to the example of FIG. 6, the controller issues an imminent failure message in response to the fuel injector state of health value 602 decreasing to less than a second warning threshold of about 50 percent useful life. The imminent failure message may persist while the fuel injector operates within state of health range 612. The imminent failure message may include an increased urgency relative to the first prognosis message. Additionally, the imminent failure message may have a different recipient group as compared to the first prognosis message.

At about region 614 the controller may determine that a fuel injector has failed when the fuel injector state of health value decreases to less than a third warning threshold. In the example of FIG. 6, a failure determination may be made in response to the fuel injector state of health value 602 decreasing to less than a third warning threshold of about 25 percent useful life. While the third warning threshold may be greater than zero indicating some useful life as shown by state of health range 616, performance may be degraded such that a message for need for urgent vehicle service may be provided to avoid powertrain shutdown related to a fuel injector fault.

A multi-tiered prognosis message system may provide different information about fuel injector health throughout different portions of fuel injector useful life. Also the prognosis system may provide a vehicle owner with information to proactively obtain vehicle service prior to an actual vehicle break down.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An engine comprising
    a plurality of combustion cylinders configured to burn a fuel to power the engine;
    a plurality of fuel injectors, each arranged to deliver fuel from a fuel tank to one of the plurality of combustion cylinders; and
    a controller programmed to
        adjust a fuel trim signal gain based on sensing exhaust flow downstream of the combustion cylinders,
        monitor a cumulative misfire count for each of the plurality of combustion cylinders, and
        issue a prognosis message identifying a state of health of at least one of the plurality of fuel injectors in response to a fuel trim signal gain exceeding an adjustment threshold and a cumulative misfire count greater than a misfire threshold.

2. The engine of claim 1 wherein the prognosis message is indicative of a fault condition of a particular one of the plurality of fuel injectors based on the cumulative misfire count of a combustion cylinder corresponding to the particular one of the plurality of fuel injectors.

3. The engine of claim 1 wherein the prognosis message is indicative of a fault condition of a bank of fuel injectors when no misfire is detected for a particular one of the plurality of fuel injectors.

4. The engine of claim 1 further comprising a catalyst downstream of the plurality of combustion cylinders to reduce pollutants in an exhaust flow, wherein exhaust oxygen content is detected upstream and downstream of the catalyst and the controller is further programmed to apply a gain to a fuel delivery signal based on a difference between the exhaust oxygen content upstream of the catalyst and the exhaust oxygen content downstream of the catalyst.

5. The engine of claim 1 wherein the plurality of fuel injectors is arranged in multiple banks and the prognosis message identifies at least one of the multiple banks when the misfire count is less than the misfire threshold.

6. The engine of claim 1 wherein the exhaust flow downstream of the combustion cylinders is indicative of an air-fuel ratio within at least one of the plurality of combustion cylinders and the fuel trim signal gain is adjusted based on an air-fuel ratio.

7. The engine of claim 1 wherein the prognosis message is issued in response to the fuel trim value exceeding the adjustment threshold for greater than a predetermined duration of time.

\* \* \* \* \*